INVENTOR.
THOMAS M. KARL

INVENTOR.
THOMAS M. KARL
BY
Merchant & Gould
ATTORNEYS

United States Patent Office 3,441,011
Patented Apr. 29, 1969

3,441,011
APPARATUS FOR CONTROLLING INTAKE AIR TEMPERATURE
Thomas M. Karl, 501 S. Broadway,
New Ulm, Minn. 56073
Filed Sept. 5, 1967, Ser. No. 665,316
Int. Cl. F02m *31/00, 7/00;* F02b *33/00*
U.S. Cl. 123—122                    9 Claims

ABSTRACT OF THE DISCLOSURE

Apparatus for varying the temperature of the air entering the carburetor of an internal combustion engine to increase the volumetric efficiency thereof. A direct expansion coil is mounted in the air filter directly above the carburetor. The coil is connected in parallel with the direct expansion coil of a standard automotive air conditioning unit for cooling the intake air, and is alternatively connected into a hot refrigerant line for heating the intake air. A temperature control device responsive to intake air temperature switches the coil from heating to cooling as needed.

BACKGROUND OF THE INVENTION

*Field of the invention*

This invention relates generally to improvements in carburetion for internal combustion engines, and more particularly relates to a system for alternatively heating or cooling the intake air to improve the volumetric efficiency of the engine.

*Description of the prior art*

An important factor in the efficiency of internal combustion engines is the manner in which air is mixed with fuel in the carbuertor. To achieve optimum efficiency, a predetermined amount of air must be drawn into the carburetor and mixed with a predetermined amount of fuel. If the proper amount of air is drawn into the carburetor, sufficient oxygen will be available to insure complete combustion of the fuel.

A problem arises from the fact that the density of air changes considerably with outside air temperature change. In extremely cold weather, the air will be quite dense, thus containing more oxygen per unit volume. In hot weather, the air will be considerably less dense and will contain much less oxygen per unit volume. Therefore, when the air temperature is high, the engine may not be able to draw in sufficient oxygen to effect complete combustion. When this occurs, engine efficiency drops off since the fuel is not completely utilized.

When the intake air temperature is too low, engine efficiency is also reduced because of problems with fuel vaporization. Thus, to obtain optimum efficiency, it is desirable to maintain air intake temperature within a predetermined optimum range.

SUMMARY OF THE INVENTION

The present invention provides apparatus for alternatively heating or cooling the air entering the carburetor of an internal combustion engine. The source of both the heating and cooling is the mechanical refrigeration system commonly used to air condition automotive vehicles today. I utilize a direct expansion-type coil mounted in the air intake filter directly above the throat of the carburetor. When cooling is required, the coil is connected in parallel with the direct expansion coil of the air conditioning system. When heating is required, the coil is connected into a hot refrigerant line. Suitable means are provided to measure the air intake temperature so that the switch over is made when needed.

DESCRIPTION OF THE PREFERRED EMBODIMENTS

Figure 2:
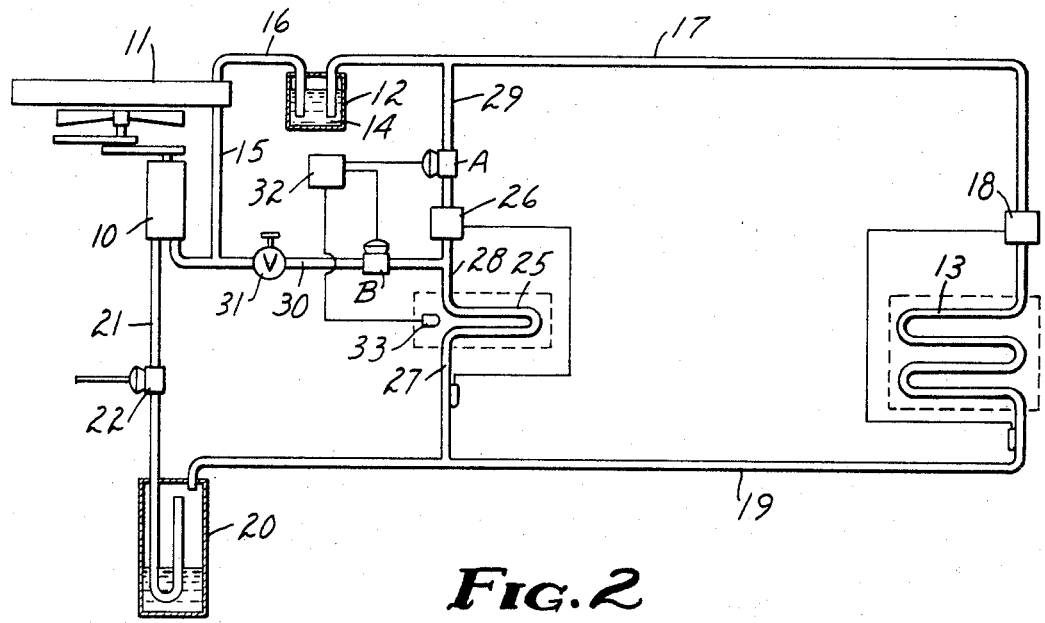
FIGURE 2 is a schematic circuit of the heating-cooling system of my invention.

Referring now to FIGURE 2, there is disclosed one embodiment of my invention. The drawing shows schematically a simplified automotive air conditioning system as modified to incorporate my invention. The standard air conditioning system includes a compressor 10, a condenser 11, a dehydrator-receiver assembly 12, and a direct expansion coil 13. The system is charged with a suitable refrigerant 14, such as Freon.

The basic refrigeration system operates as follows. Compressor 10 discharges a high pressure gas through a line 15 into condenser 11. In condenser 11, the high pressure gas is converted to a high pressure liquid which flows through a line 16 into receiver 12. The high pressure liquid in receiver 12 is drawn through a line 17 into coil 13 through an expansion valve 18. The expansion valve 18 restricts the flow of liquid and drops the pressure in coil 13 to a much lower level. The low pressure liquid entering coil 13 is boiled off by the air passing through the coil and is converted to a low pressure gas. The low pressure gas from coil 13 is carried by a line 19 to an accumulator 20 that is designed to prevent any liquid refrigerant from entering compressor 10. The low pressure gas is drawn from accumulator 20 through a suction line 21 into compressor 10, where cycle repeats itself.

Mounted in suction line 21 is a suction throttling valve 22 controlled by a temperature lever on the air conditioning control panel (not shown). Suction throttling valve 22 performs two functions in the refrigeration circuit. First, it limits minimum pressure in evaporator coil 13 to prevent freezeup of the coils, and second, it provides a means for controlling discharge air temperature from coil 13. The operation of the basic refrigeration system is well known and need not be described in any further detail here.

To modify the basic system in accordance with my invention, a second direct expansion coil 25 together with another expansion valve 26 is added. An outlet line 27 of coil 25 is connected to low pressure gas line 19. An inlet line 28 of coil 25 is connected to expansion valve 26. Valve 26 is connected by a line or conduit 29 to high pressure liquid line 17. Inlet line 28 is also connected by another line or conduit 30 to the high pressure gas discharge line 15.

Mounted in line 30 is a manually operated throttling valve 31. Mounted in line 29 to control the fluid flow therethrough is a normally closed, two-position valve A. A similar valve B is mounted in line 30. In the preferred embodiment, valves A and B are electrically operated solenoid valves, but they could also be air or vacuum operated valves. Valves A and B are controlled by a temperature control device 32 having a temperature measuring bulb 33 mounted above coil 25.

Figure 1:
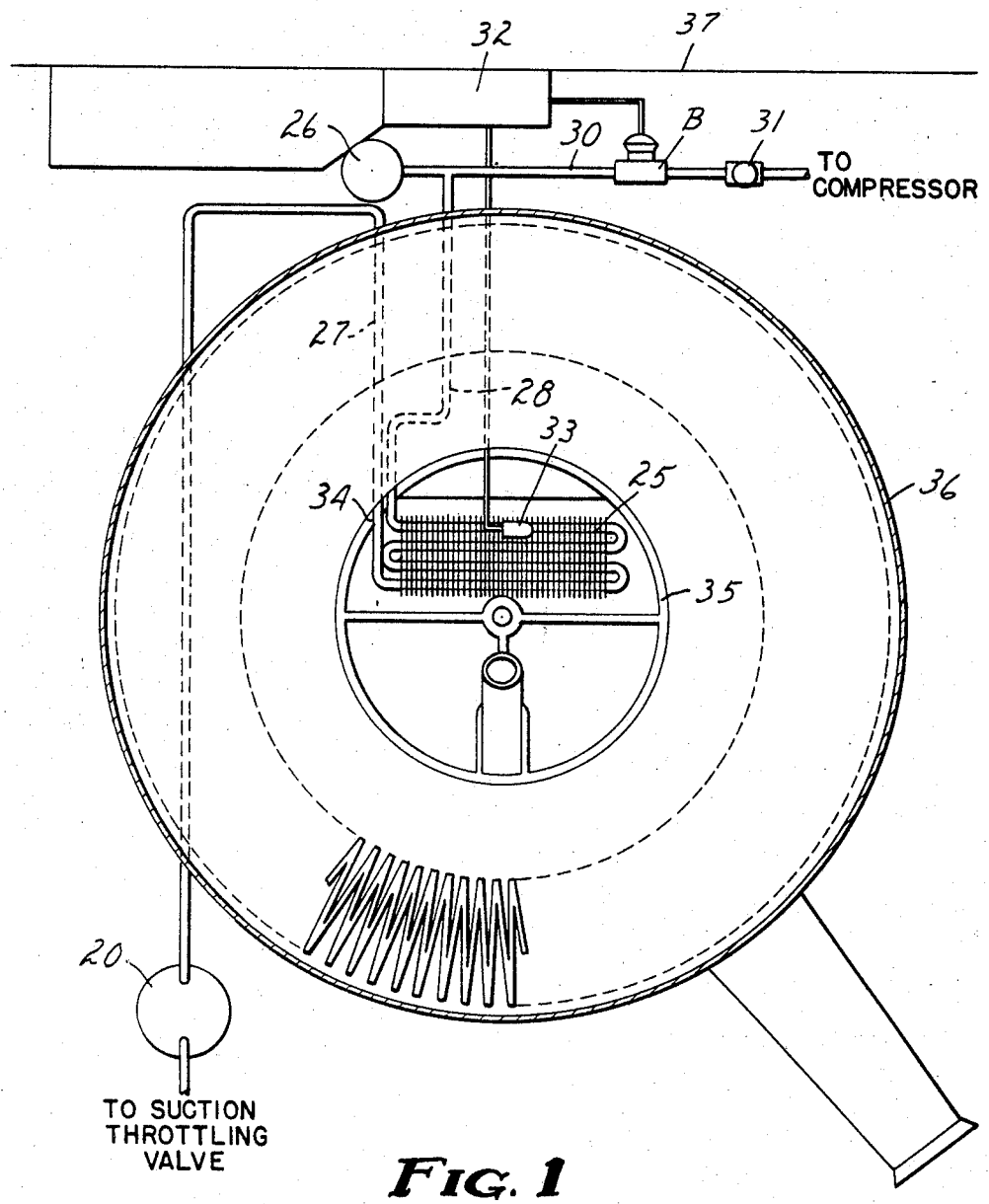
FIGURE 1 is a top plan view of the carburetor assembly, parts thereof being shown in section, showing the mounting of the heating-cooling coil of my invention.

The system for mounting the second direct expansion coil 25 is shown in FIGURE 1. Coil 25 is a small finned tube-type coil having a large surface area to insure maximum heat transfer. Coil 25 is mounted directly above the throat 35 of the carburetor. In the preferred embodiment, coil 25 is mounted within the air filter 36. A pair of slots 34 are cut into air filter 36 to permit the entrance of lines 27 and 28. Preferably, coil 25 is mounted directly over the open portion of the carburetor throat, although a larger coil could be used without departing from the invention. Temperature control device 32 is mounted on the fire wall 37 of the automobile and is connected by suitable cables to bulb 33 and to valves A and B (the connection to valve A is not shown in FIGURE 1).

The system of FIGURE 2 operates as follows. When valve A and B are both closed, the air conditioning system operates normally since coil 25 is not connected into the circuit. No flow of refrigerant through coil 25 can take place as long as both valves A and B are closed. When the air entering air filter 36 rises above a predetermined level, bulb 33 senses the temperature and controller 32 opens valve A in line 29. Valve B remains closed. With valve A open, high pressure liquid refrigerant from line 17 is available for passage through expansion valve 26 into coil 25. Since coil 25 is therefore hooked directly in parallel with coil 13, it provides the same cooling function to reduce the temperature of the air entering carburetor throat 35. As long as the air entering the air filter 36 remains above the predetermined level, valve A remains open.

When the air temperature, as sensed by bulb 33, falls below the first predetermined high level, valve A is closed to terminate the cooling. When the air temperature drops to a predetermined lower level, control device 32 opens valve B while valve A remains closed. With valve B open, the hot, high pressure gas being discharged from compressor 10 is forced through line 30 and coil 25. Valve 31 in line 30 can be adjusted to regulate the level of this flow. Valve 31 should take a sufficient pressure drop so that the pressure in the suction line 21 is not adversely affected. Since only a small portion of the hot gas is bypassed through coil 25, the remainder of the system will operate in the normal fashion. The hot gas passing through coil 25 heats the air entering carburetor throat 35.

Accumulator 20 has been added to the system to insure that no liquid refrigerant can enter compressor 10. Since accumulator 20 is basically a safety device, it may not be needed in a well-designed and well-balanced system.

Figure 2A:
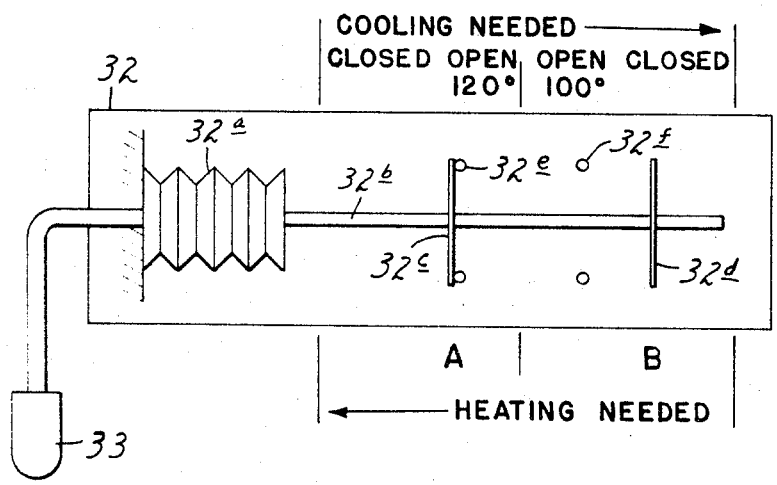
FIGURE 2A is a schematic drawing of a temperature controlled switching device for operating the heating-cooling system of FIGURE 2.

In FIGURE 2A, there is disclosed schematically a temperature control device 32 suitable for controlling valves A and B of FIGURE 2 in response to air intake temperature variation. In this device, changes in air temperature cause a liquid in bulb 33 to expand and contract to effect linear movement of a bellows assembly 32a. One end of the bellows 32a is fixed so that the other end is free to move. Connected to the free end is a slideable armature member 32b. Attached near their midpoints to member 32b are a pair of movable switch arms 32c and 32d. Two pairs of fixed contacts 32e and 32f are also provided. As member 32b moves to the left in response to a fall in temperature, switch arm 32d eventually makes contact with fixed contacts 32f. The opposite sequence of events occurs in response to a rise in temperature at bulb 33.

Although a complete wiring diagram is not shown, valve A would be connected in series with switch arm 32c and contacts 32e. Valve B would be connected in series with switch arm 32d and fixed contacts 32f. As shown on the drawing, control device 32 is adjusted so that when the temperature rises above 120° F., valve A is energized, and when the temperature falls below 120° F., valve A is deenergized. Cooling of the intake air takes place each time the intake air temperature rises above 120° F.

When the temperature falls below 120° F., valve A closes but valve B does not immediately open. Valve B does not open until switch arm 32d makes contact with fixed contacts 32f at 100° F. Therefore, below 100° F., valve B is energized (open) to permit hot gas to pass through coil 25 for heating purposes. It is noted that if the incoming air temperature is between 100° F. and 120° F., both valves A and B are closed since no conditioning of the incoming air is required.

Figure 3:
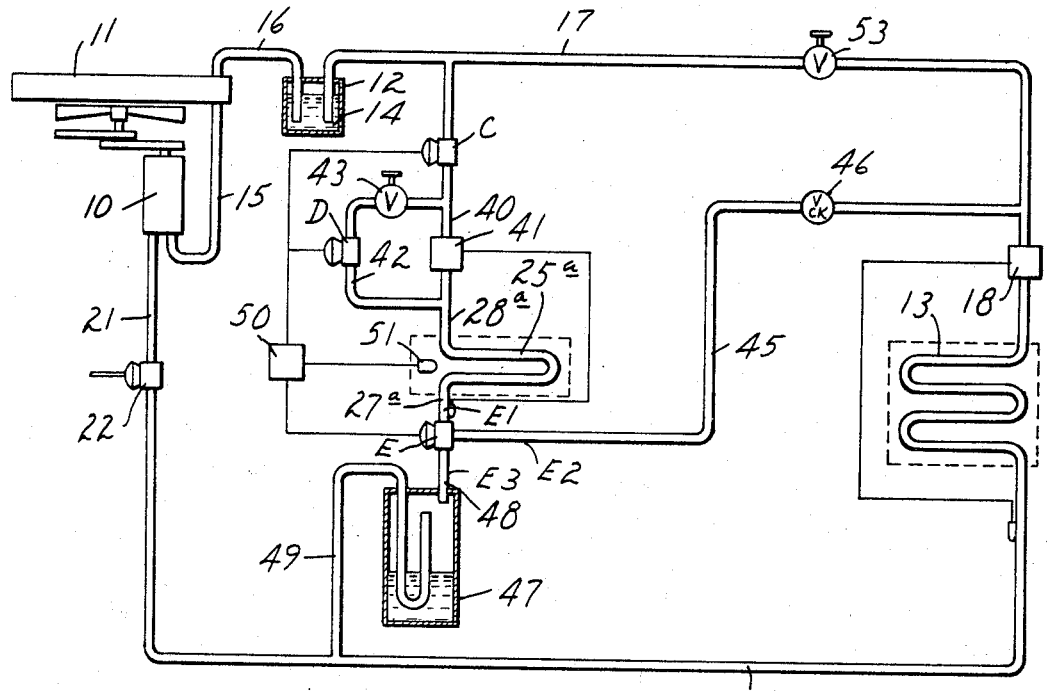
FIGURE 3 is a schematic drawing of a modified heating-cooling system according to my invention.

FIGURE 3 discloses a second embodiment of my invention in which hot liquid is passed through a coil 25a rather than hot gas, for heating purposes. The basic refrigeration system of FIGURE 3 will be identified by the same numbers as used on the basic system of FIGURE 2. New numbers will be assigned to that portion of the circuit embodying my invention.

In this embodiment of my invention, a second direct expansion coil 25a is provided having an inlet line 28a and an outlet line 27a. Coil 25a is again mounted in the position shown in FIGURE 1. Inlet line 28a is connected by a line or conduit 40 to high pressure liquid line 17. Mounted in line 40 is an expansion valve 41. A bypass line 42 is connected around expansion valve 41 so that liquid refrigerant can be bypassed around the expansion valve when desired.

A normally closed, two-position control valve C is mounted in line 40 between the inlet to bypass line 42 and the connection with line 17. A similar valve D is mounted in line 42. Also mounted in line 42 is a manually controlled throttling valve 43.

Connected by its inlet to outlet line 27a is a three-wave valve E. Valve E has an inlet port E1, an outlet port E2, and another outlet port E3. Outlet port E2 is connected by means of a conduit 45 to high pressure liquid line 17 ahead of expansion valve 18. A check valve 46 is mounted in line 45. Outlet port E3 of valve E is connected to an accumulator 47 by means of a short conduit 48. An outlet line 49 from accumulator 47 is connected to low pressure gas line 19. Accumulator 47 is designed to prevent liquid from entering compressor 10.

A temperature control device 50 is again mounted on the fire wall of the automobile and has a temperature sensing bulb 51 mounted above coil 25a. Temperature control device 50 monitors the intake air temperature and provides an output to control valves D, D, and E.

When it is desired to cool the intake air with the apparatus of FIGURE 3, valve C is opened, valve D is closed, and valve E is opened from E1 to E3. Coil 25a is then connected directly in parallel with coil 13 so that cooling of air passing through coil 25a occurs.

When it is desired to heat the air passing through coil 25a, valve C is opened, valve D is opened, and valve E is opened from port E1 to port E2. High pressures liquid refrigerant from line 17 then passes through bypass line 42, through coil 25a, through valve E and through line 45 to the inlet side of expansion valve 18. Since this circuit is in parallel with line 17, manual valve 43 and a similar manual valve 53 in line 17 are adjusted so that similar pressure drops through each circuit are obtained. As long as the main air conditioning system is operating, hot liquid will be drawn through coil 25a to heat the intake air, which liquid subsequently passes through coil 13 to cool the interior of the vehicle upon expanding into a gas.

Figure 3A:
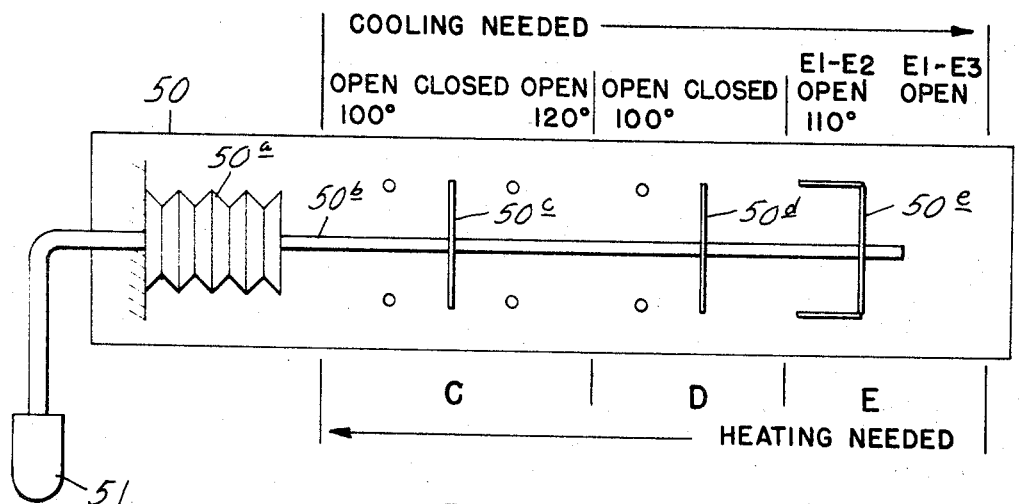
FIGURE 3A is a schematic drawing of a temperature controlled switching device for operating the heating-cooling system of FIGURE 3.

A schematic diagram of switch 50 is shown in FIGURE 3A. Again, a bellows assembly 50a is expanded and contracted by the liquid in bulb 51. An armature member 50b connected to bellows assembly 50a operates three movable switch arms 50c, 50d, and 50e. A suitable number of fixed contacts are provided.

Although the wiring diagram is not shown, it is noted that valve C is connected in series with each pair of fixed contacts associated with arm 50c so that it will be opened on either a rise in temperature above a first predetermined level or a fall in temperature below a second predetermined level. In this case, control device 50 has been adjusted so that valve C will open on a fall in temperature below 100° F. and will also open on a rise in temperature above 120° F. Between 100° F. and 120° F., valve C will always be closed.

Valve D is connected in series with the pair of fixed contacts associated with movable switch arm 50d so that it opens on a fall in temperature below 100° F. When the intake air temperature is above 100° F., valve D is always closed.

Valve E is connected in series with the pair of fixed contacts associated with movable switch arm 50e so that it becomes energized upon a fall in temperature below 110° F. This pair of switch contacts are elongated so that arm 50e remains in slidable contact therewith as armature member 50b continues to move to the left upon a drop in temperature below 110° F. When deenergized, valve E is open from E1 to E3. When energized, valve E is open from E1 to E2. Thus, above 110° F. when valve E is deenergized, it is open between E1 and E3 for cooling. Below 110° F., where valve E is energized, it is open between E1 and E2 for heating.

From the diagram of FIGURE 3A, it can be seen that valve C is open whenever either heating or cooling is needed. Valve D opens only below 100° F. where heating is needed. Since valve C is closed between 100° F. and 120° F., neither heating nor cooling of the intake air can occur within this temperature range. However, valve E switches over at the midpoint of the range so that the contents of coil 25a will be completely evacuated prior to the next operation of coil 25a. For example, when heating of the intake air is desired, valves C and D are both open and valve E is open from E1 to E2. During this time, coil 25a is filled with hot liquid refrigerant. Before the operation of the system reverses to a situation where cooling of the intake air is desired, it is desirable that the liquid in coil 25a be removed so that there is no chance of liquid being drawn into compressor 10. Therefore, when the intake air temperature rises above 110° F., valve E is deenergized to open port E1 to port E3. The liquid in coil 25a is evacuated into accumulator 47, where it begins to evaporate with the resulting gases being carried off to the compressor through line 49. Since the cooling cycle does not begin until the intake air temperature rises above 120° F., sufficient time is provided to fully evacuate coil 25a.

The present invention increases the volumetric efficiency of the engine under high temperature operating conditions by cooling the air entering the carburetor. Under low temperature conditions, improved fuel economy is achieved by heating the air entering the carburetor. The assigned levels of 100° F. and 120° F. for starting a heating or cooling process in the system is designed to avoid a frequent fluctuation in the type of medium being introduced into the carburetor coil. Frequent switching between heating and cooling is therefore avoided, and the possibility of mixing between the two different mediums is reduced or fully eliminated.

What is claimed is:

1. In an automotive vehicle having an internal combustion engine and an air conditioning system with a first direct expansion coil for cooling the interior of said vehicle, means for varying the temperature of the air entering the carburetor of said engine to increase the efficiency of said engine, comprising:
    (a) a second direct expansion coil mounted in the path of the air entering said carburetor;
    (b) control means for measuring the temperature of said air and for producing an output in response thereto;
    (c) means including conduit means and valve means responsive to the output of said control means for connecting said second direct expansion coil in parallel with said first direct expansion coil upon said air temperature rising above a first predetermined level; and
    (d) means including conduit means and valve means responsive to the output of said control means for alternatively connecting said second direct expansion coil in a hot refrigerant line to heat said air upon said air temperature falling below a second predetermined level.

2. The apparatus of claim 1 wherein said second direct expansion coil is a finned tube coil and is mounted within the engine intake air filter directly above the throat of said carburetor.

3. The apparatus of claim 1 wherein said second direct expansion coil has an inlet line and an outlet line, wherein said inlet line is connected by a first conduit and a restricter device to the high pressure liquid line of the air conditioning system for cooling, and is connected by a second conduit to the high pressure vapor line of the air conditioning system for heating, wherein a separate flow-control valve operated by said control means is mounted in each of said first and second conduits, and wherein said outlet line is connected to the suction line of the air conditioning system.

4. The apparatus of claim 3 wherein an accumulator is connected into said suction line to prevent liquid refrigerant from entering the compressor.

5. The apparatus of claim 1 wherein said second direct expansion coil has an inlet line and an outlet line, wherein said inlet line is connected by a third conduit and a restrictor device to the high pressure liquid line of the air conditioning system for cooling, wherein a bypass line is connected around said restricter device for heating, wherein said outlet line is connected by a fourth conduit to said high pressure liquid line downstream from said third conduit and is connected by a fifth conduit to said suction line, wherein separate flow-control valves operated by said control means are mounted in said third conduit and in said bypass line, and wherein a three-way control valve operated by said control means connects said outlet line to said fourth and fifth conduits, said control means operating said valves to provide flow through said third conduit, said second direct expansion coil and said fifth conduit when cooling is needed, and to provide flow through said bypass line, said second direct expansion coil and said fourth conduit when heating is needed.

6. In an automotive vehicle having an internal combustion engine and an air conditioning system with a first coil for cooling said vehicle, means for varying the carburetor air intake temperature to increase the efficiency of said engine comprising:
    (a) a second coil having an inlet line and an outlet line mounted in the path of said intake air;
    (b) means including conduit means and valve means for connecting said second coil in parallel with said first coil upon said intake air temperature rising above a first predetermined level; and
    (c) means including valve means and a conduit extending between said inlet line and the compressor discharge line for alternatively passing hot gas through said second coil upon said intake air temperature falling below a second predetermined level.

7. In an automotive vehicle having an internal combustion engine and an air conditioning system with a first coil for cooling said vehicle, means for varying the carburetor air intake temperature to increase the efficiency of said engine, comprising:
    (a) a second coil, having an inlet line and an outlet line, mounted in the path of said intake air;
    (b) means including conduit means and valve means for connecting said second coil in parallel with said first coil upon said intake air temperature rising above a first predetermined level; and
    (c) means including conduit means and valve means for alternatively connecting said second coil in parallel with the high pressure liquid line between the condenser and said first coil upon said air intake temperature falling below a second predetermined level.

8. In an automotive vehicle having an internal combustion engine and an air conditioning system with a first coil for cooling said vehicle, means for cooling the carburetor air intake temperature to increase the volumetric efficiency of said engine, comprising:
  (a) a second coil mounted in the path of said intake air;
  (b) means for connecting said second coil in parallel with said first coil to cool said intake air upon the passage of refrigerant therethrough; and
  (c) means for controlling the flow of refrigerant through said second coil in response to air intake temperature.

9. The apparatus of claim 8 including means for alternatively passing hot refrigerant through said second coil in response to said air intake temperature falling below a predetermined level to heat said intake air.

References Cited

UNITED STATES PATENTS

| | | |
|---|---|---|
| 1,821,662 | 9/1931 | Muller _____ 123—122 |
| 2,082,397 | 6/1937 | Hiscock _____ 123—119 |
| 2,145,678 | 1/1939 | Backstrom _____ 123—122 X |
| 2,368,642 | 2/1945 | Crago. |
| 2,372,272 | 3/1945 | Helmore. |
| 2,385,033 | 9/1945 | Schwarz. |
| 2,558,797 | 7/1951 | Theiss _____ 123—122 |
| 3,332,476 | 7/1967 | McDougal _____ 123—41.31 X |

AL LAWRENCE SMITH, *Primary Examiner.*

U.S. Cl. X.R.

62—196, 200, 323; 123—41.31, 119; 165—26, 43